|  |
|---|

United States Patent
Harmon

(10) Patent No.: US 9,913,201 B1
(45) Date of Patent: Mar. 6, 2018

(54) SYSTEMS AND METHODS FOR DETECTING POTENTIALLY ILLEGITIMATE WIRELESS ACCESS POINTS

(71) Applicant: Symantec Corporation, Mountain View, CA (US)

(72) Inventor: Justin Harmon, Knoxville, TN (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/608,218

(22) Filed: Jan. 29, 2015

(51) Int. Cl.
H04L 29/06 (2006.01)
H04W 48/04 (2009.01)
H04W 4/02 (2018.01)

(52) U.S. Cl.
CPC ......... *H04W 48/04* (2013.01); *H04L 63/1416* (2013.01); *H04W 4/023* (2013.01)

(58) Field of Classification Search
CPC ... H04L 63/10; H04L 63/101; H04L 63/1416; H04L 63/164; H04L 63/1483; H04L 63/14; H04W 64/003; H04W 12/08; H04W 12/12; H04W 48/04; H04W 4/023
See application file for complete search history.

(56) References Cited

U.S. PATENT DOCUMENTS

| 8,191,143 B1 | 5/2012 | Lin et al. |
|---|---|---|
| 8,606,219 B1 | 12/2013 | Barbee et al. |
| 8,844,041 B1 | 9/2014 | Kienzle et al. |
| 9,420,513 B1 | 8/2016 | Yalagandula et al. |
| 9,730,075 B1 | 8/2017 | Shavell et al. |
| 2003/0219008 A1 | 11/2003 | Hrastar |
| 2003/0233567 A1 | 12/2003 | Lynn et al. |
| 2004/0117624 A1 | 6/2004 | Brandt et al. |
| 2004/0236547 A1 | 11/2004 | Rappaport et al. |
| 2006/0193284 A1 | 8/2006 | Stieglitz et al. |
| 2006/0200862 A1 | 9/2006 | Olson et al. |

(Continued)

OTHER PUBLICATIONS

Ankit Kurani; Systems and Methods for Detecting Potentially Illegitimate Wireless Access Points; U.S. Appl. No. 14/732,811, filed Jun. 8, 2015.

(Continued)

*Primary Examiner* — Edward Zee
*Assistant Examiner* — Chi Nguy
(74) *Attorney, Agent, or Firm* — FisherBroyles, LLP

(57) ABSTRACT

The disclosed computer-implemented method for detecting potentially illegitimate wireless access points may include (1) detecting an attempt by the computing device to automatically connect to a wireless access point that resembles a known wireless access point whose geographic location is stored by the computing device, (2) identifying a current geographic location of the computing device, (3) determining that the current geographic location of the computing device is beyond a certain distance from the geographic location of the known wireless access point, and then (4) determining, based at least in part on the determination that the current geographic location of the computing device is beyond the certain distance from the geographic location of the known wireless access point, that the wireless access point is potentially illegitimate. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0079376 | A1 | 4/2007 | Robert et al. |
| 2007/0153763 | A1 | 7/2007 | Rampolla et al. |
| 2007/0283042 | A1 | 12/2007 | West et al. |
| 2010/0172259 | A1 | 7/2010 | Aggarwal et al. |
| 2010/0207732 | A1* | 8/2010 | Patwari ............... G01S 5/0252 340/10.1 |
| 2012/0304297 | A1* | 11/2012 | Chung ............... H04L 63/1416 726/23 |
| 2012/0309420 | A1* | 12/2012 | Morgan .................. G01S 5/02 455/456.1 |
| 2013/0182697 | A1 | 7/2013 | Tuominen et al. |
| 2013/0217358 | A1 | 8/2013 | Snider |
| 2013/0217411 | A1 | 8/2013 | Croy et al. |
| 2014/0201808 | A1 | 7/2014 | Yada |
| 2014/0304770 | A1 | 10/2014 | Jung |
| 2014/0378059 | A1 | 12/2014 | Ouchi |
| 2015/0024787 | A1 | 1/2015 | Ben-Itzhak et al. |
| 2016/0029217 | A1* | 1/2016 | Yoo ....................... H04W 12/08 726/4 |
| 2016/0149935 | A1* | 5/2016 | Liu ....................... H04W 12/12 726/7 |
| 2016/0192136 | A1 | 6/2016 | Pan et al. |
| 2016/0316426 | A1 | 10/2016 | Kumar |

OTHER PUBLICATIONS

"Domain Name System", http://en.wikipedia.org/wiki/Domain_Name_System, as accessed Apr. 6, 2015, Wikipedia, (Jan. 23, 2004).

Mitchell, Bradley "What Is a DNS Server?", http://compnetworking.about.com/od/dns_domainnamesystem/f/dns_servers.htm, as accessed Apr. 6, 2015, (Feb. 19, 2007).

"What is the difference between public and private IP addresses?", http://supportcenter.verio.com/KB/questions.php?questionid=655, as accessed Apr. 6, 2015, Verio Inc., (on or before Apr. 6, 2015).

Michael Shavell, et al; Systems and Methods for Detecting Illegitimate Devices on Wireless Networks; U.S. Appl. No. 14/616,763, filed Feb. 9, 2015.

Michael Shavell, et al; Systems and Methods for Detecting Illegitimate Devices on Wireless Networks; U.S. Appl. No. 14/616,761; filed Feb. 9, 2015.

Justin Harmon; Systems and Methods for Detecting Potentially Illegitimate Wireless Access Points; U.S. Appl. No. 14/625,075, filed Feb. 18, 2015.

Lim, Kwontaek et al., "Scheme of Rogue AP detection in managed WLAN based on AP's location", http://xuebao.nuc.edu.cn/new/english.php?id=85&tid=646, as accessed Dec. 3, 2014, Journal of Measurement Science and Instrumentation, vol. 3 No. 4, Sum No. 12, (Dec. 2012).

Lim, Kwontaek et al., "Scheme of Rogue AP detection in managed WLAN based on AP's location", http://xuebao.nuc.edu.cn/new/uploads/File/jmsi2012-4-370.pdf, as accessed Dec. 3, 2014, Journal of Measurement Science and Instrumentation, vol. 3 No. 4, Sum No. 12, (Dec. 2012), pp. 370-373.

"WiFi Pineapple", https://www.wifipineapple.com/, as accessed Dec. 3, 2014, (Sep. 26, 2011).

"Smart WiFi Toggler", https://play.google.com/store/apps/details?id=com.sebouh00.smartwifitoggler&hl=en, as accessed Dec. 3, 2014, (Dec. 13, 2012).

"Coordinate Distance Calculator", http://boulter.com/gps/distance/?from=38.2500%B0+N%c2C+85.7667%B0+W&to=38.0297%B0+N%2C+84.4947%B0+W&units=m, as accessed Dec. 3, 2014, (on or before Dec. 3, 2014).

"802.11 WLAN Packet Types", http://www.wildpackets.com/resources/compendium/wireless_lan/wlan_packet_types, as accessed Dec. 3, 2014, WildPackets, Inc., (Apr. 15, 2010).

"Wireless access point", http://en.wikipedia.org/wiki/Wireless_access_point, as accessed Dec. 3, 2014, Wikipedia, (Apr. 14, 2004).

"Stop connecting to a particular wifi network based on my location", http://android.stackexchange.com/questions/83925/stop-connecting-to-a-particular-wifi-network-based-on-my-location, as accessed Dec. 3, 2014, (Oct. 2, 2014).

"How to block apps on tablet from accessing the Internet while on tethering", http://android.stackexchange.com/questions/63987/how-to-block-apps-on-tablet-from-accessing-the-internet-while-on-tethering, as accessed Dec. 3, 2014, (Feb. 21, 2014).

Cipriani, Jason "Stop Android 4.3 from always scanning for Wi-Fi networks", http://www.cnet.com/how-to/stop-android-4-3-from-always-scanning-for-wi-fi-networks/, as accessed Dec. 3, 2014, (Aug. 2, 2013).

Boubina Dr, "How to Disable Wifi Auto Connect on iPhone", https://snapguide.com/guides/disable-wifi-auto-connect-on-iphone/, as accessed Dec. 3, 2014, (Jul. 22, 2012).

"LG G3—WiFi Auto-On Issue", https://support.t-mobile.com/thread/75809, as accessed Dec. 3, 2014, (Aug. 7, 2014).

"Best Practices for Rogue Detection and Annihilation", http://airmagnet.flukenetworks.com/assets/whitepaper/Rogue_Detection_White_Paper.pdf, as accessed Dec. 3, 2014, A Technical Whitepaper, AirMagnet, Inc., (Nov. 2004).

"How do you prevent rogue wireless access points on a network?", http://networkengineering.stackexchange.com/questions/123/how-do-you-prevent-rogue-wireless-access-points-on-a-network, as accessed Dec. 3, 2014, (May 8, 2013).

K. N., Gopinath et al., "All You Wanted to Know About WiFi Rogue Access Points", http://www.rogueap.com/rogue-ap-docs/RogueAP-FAQ.pdf, as accessed Dec. 3, 2014, AirTight Networks, Inc., (2009).

"Rogue access point", http://en.wikipedia.org/wiki/Rogue_access_point, as accessed Dec. 3, 2014, Wikipedia, (Oct. 22, 2005).

"Rogue access points: Preventing, detecting and handling best practices", http://searchnetworking.techtarget.com/Rogue-access-points-Preventing-detecting-and-handling-best-practices, as accessed Dec. 3, 2014, TechTarget, (May 2009).

"Tracking down a rogue access point", http://security.stackexchange.com/questions/10783/tracking-down-a-rogue-access-point, as accessed Dec. 9, 2014, (Jan. 18, 2012).

"Traceroute", https://en.wikipedia.org/wiki/Traceroute, as accessed Dec. 9, 2014, Wikipedia, (Feb. 24, 2004).

Hunt, Troy "The beginners guide to breaking website security with nothing more than a Pineapple", http://www.troyhunt.com/2013/04/the-beginners-guide-to-breaking-website.html, as accessed Dec. 9, 2014, (Apr. 17, 2013).

Michael Shavell, et al.; Systems and Methods for Detecting Illegitimate Devices on Wireless Networks; U.S. Appl. No. 14/617,245, filed Feb. 9, 2015.

"Why don't wifi managers remember mac addresses for hotspots to defeat the jasager attack?", http://security.stackexchange.com/questions/14854/why-dont-wifi-managers-remember-mac-addresses-for-hotspots-to-defeat-the-jasage, as accessed Dec. 9, 2014, (May 10, 2012).

"7. MAC Frame Formats", http://grouper.ieee.org/groups/802/15/pub/2001/Jul01/01292r1P802-15_TG3-Proposed-Changes-to-Frame-Formats.pdf, as accessed Dec. 9, 2014, (2001).

"Frame check sequence", http://en.wikipedia.org/wiki/Frame_check_sequence, as accessed Dec. 9, 2014, Wikipedia, (Apr. 5, 2005).

"Service set (802.11 network)", http://en.wikipedia.org/wiki/Service_set_%28802.11_network%29, as accessed Dec. 9, 2014, Wikipedia, (Jul. 10, 2009).

"Part 11: Wireless LAN Medium Access Control (MAC) and Physical Layer (PHY) Specifications", http://standards.ieee.org/getieee802/download/802.11-2012.pdf, as accessed Dec. 9, 2014, IEEE Std 802.11™-2012 (Revision of IEEE Std 802.11-2007), IEEE Computer Society, New York, (Feb. 6, 2012).

Dai Zovi, Dino A., "KARMA Attacks Radioed Machines Automatically", http://theta44.org/karma/, as accessed Dec. 9, 2014, (Jan. 17, 2006).

Girsas, Paul "Wifi Radar", https://play.google.com/store/apps/details?id=girsas.wifiradar&hl=en, as accessed Jan. 16, 2015, (Dec. 24, 2013).

"Chapter 6—Configuring Radio Setting", http://www.cisco.com/c/en/us/td/docs/wireless/access_point/12-4_10b_JA/configuration/guide/scg12410b/scg12410b-chap6-radio.html, as accessed Jan. 16, 2015, Cisco, (on or before Sep. 15, 2014).

(56) References Cited

OTHER PUBLICATIONS

"Chapter 9—Configuring an Access Point as a Local Authenticator", http://www.cisco.com/c/en/us/td/docs/wireless/access_point/12-4_10b_JA/configuration/guide/scg12410b/scg12410b-chap9-localauth.html, as accessed Jan. 16, 2015, Cisco, (on or before Sep. 6, 2014).

"WLA Series Wireless LAN Access Points", https://www.juniper.net/assets/us/en/local/pdf/datasheets/1000359-en.pdf, as accessed Jan. 16, 2015, Data Sheet, Juniper Networks, Inc., (Jun. 2013).

"Aruba 100 Series Access Points", http://www.arubanetworks.com/assets/ds/DS_AP100Series.pdf, as accessed Jan. 16, 2015, Data Sheet, Aruba Networks, Inc., (on or before Jan. 16, 2015).

Notenboom, Leo A., "How can I block neighboring wireless networks?", http://ask-leo.com/how_can_i_block_neighboring_wireless_networks.html, as accessed Jan. 16, 2015, (Jan. 30, 2007).

Roos, Dave "How Wireless Mesh Networks Work", http://computer.howstuffworks.com/how-wireless-mesh-networks-work.htm, as accessed Jan. 16, 2015, (Dec. 4, 2008).

Leslie, David "Rogue Wireless Access Point Detection and Remediation", http://www.giac.org/paper/gsec/4060/rogue-wireless-access-point-detection-remediation/106460, as accessed Jan. 16, 2015, Global Information Assurance Certification Paper, SANS Institute 2004, (Sep. 9, 2004).

Pacchiano, Ronald "How to Track Down Rogue Wireless Access Points", http://www.smallbusinesscomputing.com/webmaster/article.php/3590656/How-to-Track-Down-Rogue-Wireless-Access-Points.htm, as accessed Jan. 16, 2015, (Mar. 10, 2006).

"Rogue Detection under Unified Wireless Networks", http://www.cisco.com/c/en/us/support/docs/wireless-mobility/wireless-lan-wlan/70987-rogue-detect.html, as accessed Jan. 16, 2015, Document ID: 70987, Cisco, (on or before Sep. 25, 2007).

"Locating Rogue WiFi Access Points", https://www.virtuesecurity.com/blog/locating-rogue-wifi-access-points/, as accessed Jan. 16, 2015, Virtue Security, (Oct. 5, 2013).

"NetSurveyor—802.11 Network Discovery / WiFi Scanner", http://nutsaboutnets.com/netsurveyor-wifi-scanner/, as accessed Jan. 16, 2015, Nuts About Nets, (Nov. 16, 2011).

Michael Shavell, et al.; Systems and Methods for Preventing Computing Devices from Sending Wireless Probe Packets; U.S. Appl. No. 14/949,927, filed Nov. 24, 2015.

"802.11 WLAN Packet Types", http://www.wildpackets.com/resources/compendium/wireless_lan/wlan_packet_types, as accessed Oct. 14, 2015, (Apr. 15, 2010).

Michael Shavell, et al.; Systems and Methods for Detecting Network Security Deficiencies on Endpoint Devices; U.S. Appl. No. 15/199,149, filed Jun. 30, 2016.

Captive portal; https://en.wikipedia.org/wiki/Captive_portal, as accessed May 17, 2016; Wikipedia; (Jan. 25, 2005).

\* cited by examiner

Known Location Information
210

GPS Coordinates: 38.0297° N, 84.4947° W

Current Location Information
212

GPS Coordinates: 38.2500° N, 85.7667° W

*FIG. 4*

SYSTEMS AND METHODS FOR DETECTING POTENTIALLY ILLEGITIMATE WIRELESS ACCESS POINTS

BACKGROUND

Wireless access points may provide users of internet-enabled devices with efficient and/or widespread access to wired network connections. For example, an enterprise may provide employees and/or customers with wireless access to a Local Area Network (LAN) by implementing multiple access points throughout a building covered by the LAN. In addition, a router within a personal or home network may include a wireless access point that provides wireless Internet service to multiple devices within a home. To facilitate an efficient connection to a wireless access point, many computing devices may store the configuration details of the wireless access point after connecting to the wireless access point for the first time. When re-entering the range of the wireless access point, the computing devices may request access to the wireless access point and quickly re-connect.

Unfortunately, traditional technologies for connecting computing devices to wireless access points may have certain security deficiencies that leave the computing devices vulnerable to attack. For example, conventional network security systems may fail to provide any reliable and/or trusted techniques for computing devices to verify the legitimacy or identity of wireless access points. As a result, an attacker may configure a malicious device (e.g., a so-called WIFI PINEAPPLE) to mimic the credentials of a wireless access point known to a computing device. The malicious device may then enable the computing device to connect to an illegitimate access point that appears to be the known access point. After the computing device connects to the illegitimate access point, the attacker may view all network traffic distributed to and from the computing device.

The instant disclosure, therefore, identifies and addresses a need for improved systems and methods for detecting potentially illegitimate wireless access points.

SUMMARY

As will be described in greater detail below, the instant disclosure describes various systems and methods for detecting potentially illegitimate wireless access points by determining that a computing device is attempting to re-connect to a wireless access point that resembles a known wireless access point but is beyond a certain distance from a geographic location associated with the known wireless access point.

In one example, a computer-implemented method for detecting potentially illegitimate wireless access points may include (1) detecting an attempt by the computing device to automatically connect to a wireless access point that resembles a known wireless access point whose geographic location is stored by the computing device, (2) identifying a current geographic location of the computing device, (3) determining that the current geographic location of the computing device is beyond a certain distance from the geographic location of the known wireless access point, and then (4) determining, based at least in part on the determination that the current geographic location of the computing device is beyond the certain distance from the geographic location of the known wireless access point, that the wireless access point is potentially illegitimate.

In some examples, the method may include detecting an attempt by the computing device to automatically connect to a wireless access point alleging to be the known wireless access point. In these examples, the method may include transmitting, from the computing device, a request to connect to the known wireless access point. The method may then include receiving, from the wireless access point and in response to the transmitted request, a communication in which the wireless access point alleges to be the known wireless access point.

In some embodiments, the method may include identifying the geographic location of the known wireless access point prior to detecting the attempt to automatically connect to the wireless access point. In such embodiments, the method may include (1) establishing a connection from the computing device to the known wireless access point, (2) identifying a geographic location of the computing device while the computing device is connected to the known wireless access point, and (3) storing, within the computing device, an association between the known wireless access point and the geographic location of the computing device while the computing device is connected to the known wireless access point.

In some examples, the method may include querying a Global Positioning System (GPS) device within the computing device and/or analyzing an internet protocol address of the computing device in order to identify the geographic location of the computing device while the computing device is connected to the known wireless access point. Similarly, the method may include querying the GPS device and/or analyzing a current internet protocol address in order to identify the current geographic location of the computing device. In these examples, the method may include determining that the current geographic location of the computing device exceeds a certain radius from the geographic location of the known wireless access point.

In some embodiments, the method may include identifying at least one additional network within a range of the known wireless access point. In such embodiments, the method may include determining that the additional network is not within the range of the wireless access point.

In some examples, the method may include blocking access to the wireless access point in response to determining that the wireless access point is potentially illegitimate. Additionally or alternatively, the method may include prompting a user of the computing device to manually decide whether to connect to the wireless access point in response to determining that the wireless access point is potentially illegitimate.

In some embodiments, the method may include detecting an attempt by the computing device to automatically connect to an additional wireless access point that resembles the known wireless access point. The method may then include identifying an additional current geographic location of the computing device. Next, the method may include determining that the additional current geographic location of the computing device is within the certain distance from the geographic location of the known wireless access point. Additionally or alternatively, the method may include enabling the computing device to connect to the additional wireless access point in response to determining that the additional current geographic location of the computing device is within the certain distance from the geographic location of the known wireless access point.

In one embodiment, a system for implementing the above-described method may include (1) a detection module that detects an attempt by the computing device to automatically connect to a wireless access point that resembles a known wireless access point whose geographic location is stored by the computing device, (2) an identification module that identifies a current geographic location of the computing device, and (3) a determination module that (A) determines that the current geographic location of the computing device is beyond a certain distance from the geographic location of the known wireless access point and (B) determines, based at least in part on the determination that the current geographic location of the computing device is beyond the certain distance from the geographic location of the known wireless access point, that the wireless access point is potentially illegitimate. In addition, the system may include at least one processor configured to execute the detection module, the identification module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect an attempt by the computing device to automatically connect to a wireless access point that resembles a known wireless access point whose geographic location is stored by the computing device, (2) identify a current geographic location of the computing device, (3) determine that the current geographic location of the computing device is beyond a certain distance from the geographic location of the known wireless access point, and then (4) determine, based at least in part on the determination that the current geographic location of the computing device is beyond the certain distance from the geographic location of the known wireless access point, that the wireless access point is potentially illegitimate.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of exemplary information that identifies the location of wireless access points.

Figure 1:
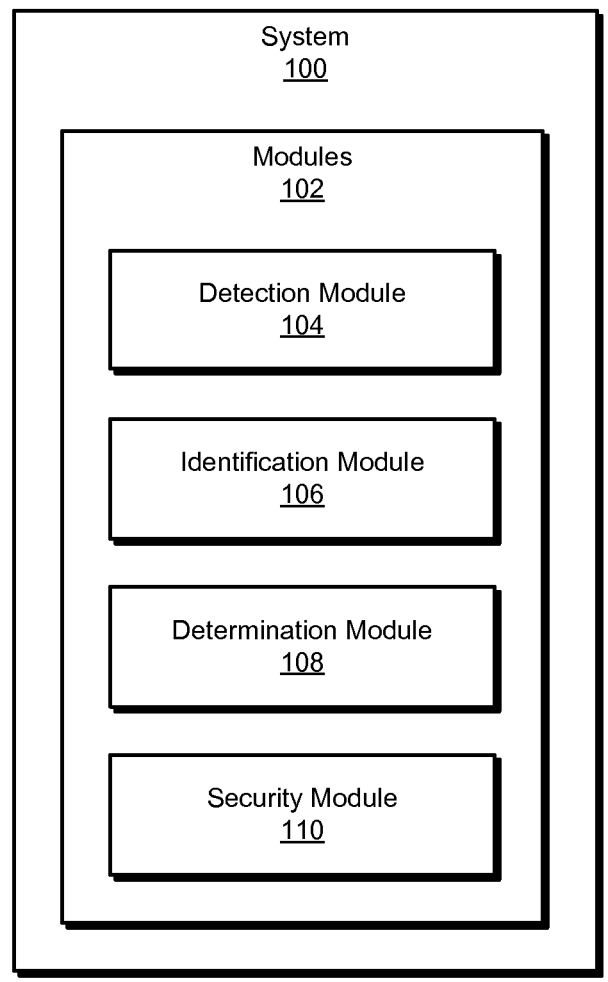
FIG. 1 is a block diagram of an exemplary system for detecting potentially illegitimate wireless access points.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting potentially illegitimate wireless access points. As will be explained in greater detail below, by detecting an attempt by a computing device to automatically connect to a wireless access point that resembles a known wireless access point, the systems and methods described herein may analyze the wireless access point to determine whether the wireless access point is potentially illegitimate. For example, the disclosed systems and methods may identify a potentially illegitimate wireless access point by determining that the current geographic location of a computing device attempting to connect to the potentially illegitimate wireless access point is beyond a certain distance from the location of a known wireless access point.

Moreover, by determining that an access point claiming to be a known access point is outside of a geographic region associated with the known access point, the disclosed systems and methods may be able to determine that an attacker is attempting to falsely disguise the access point as the known access point (e.g., that the attacker is spoofing the known access point). The disclosed systems and methods may then prevent computing devices from connecting to illegitimate access points that attackers may use to obtain sensitive information distributed via the illegitimate access points.

Figure 2:
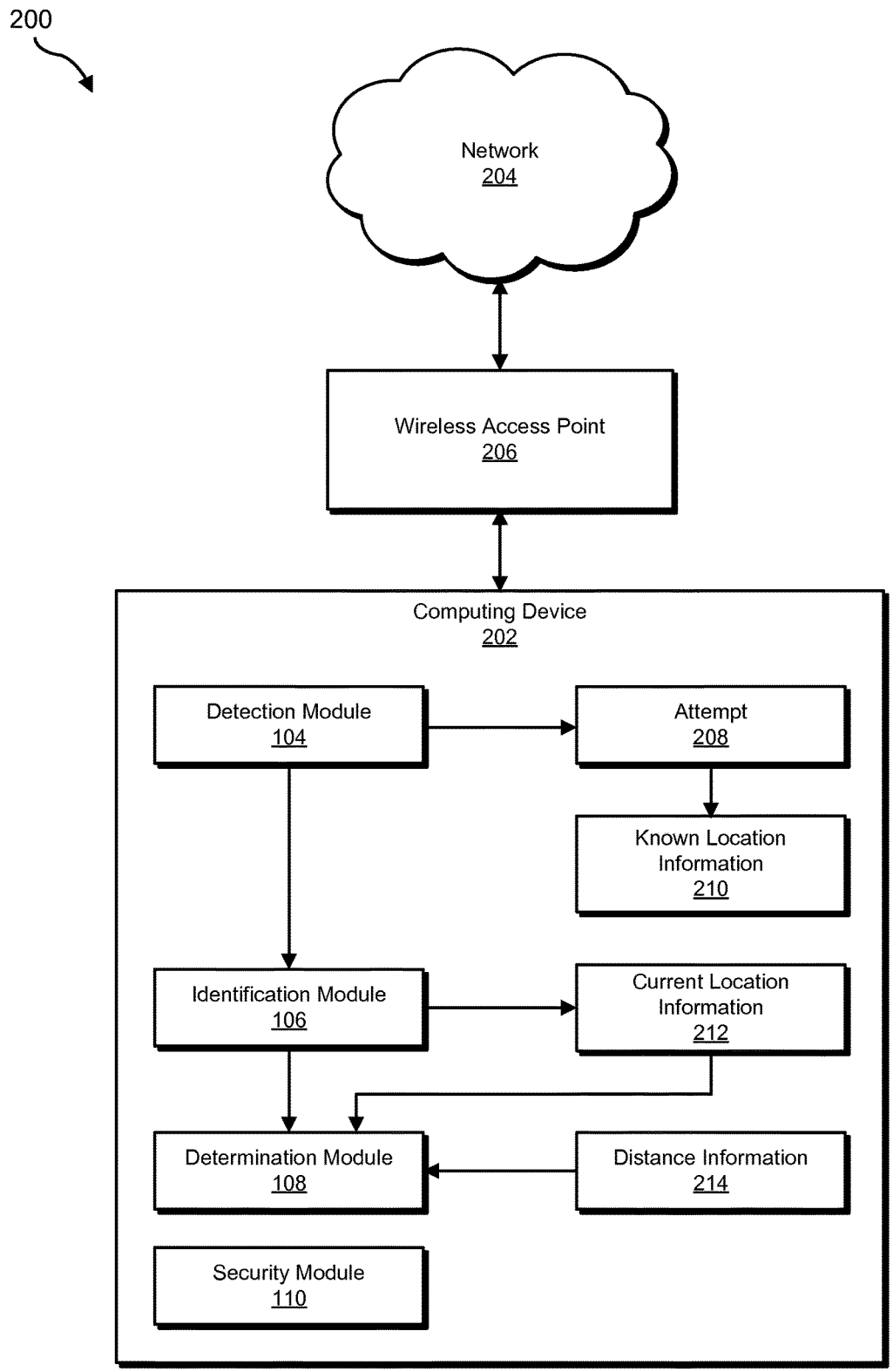
FIG. 2 is a block diagram of an additional exemplary system for detecting potentially illegitimate wireless access points.

The following will provide, with reference to FIGS. 1-2, detailed descriptions of exemplary systems for detecting potentially illegitimate wireless access points. Detailed descriptions of corresponding computer-implemented methods will also be provided in connection with FIG. 3. In addition, detailed descriptions of information that identifies the location of wireless access points will be provided in connection with FIG. 4. Detailed descriptions of locations of computing devices that are beyond certain distances from the locations of known wireless access points will be provided in connection with FIG. 5. Finally, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting potentially illegitimate wireless access points. As illustrated in this figure, exemplary system 100 may include one or more modules 102 for performing one or more tasks. For example, and as will be explained in greater detail below, exemplary system 100 may include a detection module 104 that detects an attempt by a computing device to automatically connect to a wireless access point that resembles a known wireless access point whose geographic location is stored by the computing device. Exemplary system 100 may also include an identification module 106 that identifies a current geographic location of the computing device.

In addition, and as will be described in greater detail below, exemplary system 100 may include a determination module 108 that (1) determines that the current geographic location of the computing device is beyond a certain distance from the geographic location of the known wireless access point and (2) determines, based at least in part on the determination that the current geographic location of the computing device is beyond the certain distance from the geographic location of the known wireless access point, that the wireless access point is potentially illegitimate. Finally, exemplary system 100 may include a security module 110 that performs at least one security action in response to the determination that the wireless access point is potentially illegitimate. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 that is attempting to connect to a network 204 via a wireless access point 206. In one example, computing device 202 may be programmed with one or more of modules 102 in order to determine the legitimacy of wireless access point 206.

In one embodiment, one or more of modules 102 from FIG. 1 may, when executed by at least one processor of computing device 202, enable computing device 202 to detect potentially illegitimate wireless access points. For example, and as will be described in greater detail below, detection module 104 may cause computing device 202 to detect an attempt (e.g., attempt 208) by a computing device (e.g., computing device 202) to automatically connect to a wireless access point (e.g., wireless access point 206) that resembles a known wireless access point whose geographic location is stored by computing device 202 (within, e.g., known location information 210). Identification module 106 may then cause computing device 202 to identify a current geographic location of computing device 202 (stored within, e.g., current location information 212). Next, determination module 108 may cause computing device 202 to determine that the current geographic location of computing device 202 is beyond a certain distance (specified by, e.g., distance information 214) from the geographic location of the known wireless access point. Finally, determination module 108 may cause computing device 202 to determine, based at least in part on the determination that the current geographic location of computing device 202 is beyond the certain distance from the geographic location of the known wireless access point, that wireless access point 206 is potentially illegitimate.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Wireless access point 206 generally represents any type or form of physical or virtual wireless access point. The term "wireless access point," as used herein, generally refers to any device and/or portion of executable code that enables a computing device to wirelessly connect to a wired network. In some examples, a wireless access point may receive a request from a computing device to access the wireless access point and/or a network to which the wireless access point provides access. The wireless access point may then facilitate the process of connecting the computing device to the network. In some embodiments, a wireless access point may reside within a router, switch, or other network device. In other embodiments, a wireless access point may represent a separate physical device. In additional embodiments, and as will be explained in greater detail below, a malicious network device may emulate or replicate a particular wireless access point.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, a Power Line Communications (PLC) network, a cellular network (e.g., a Global System for Mobile Communications (GSM) network), exemplary network architecture 700 in FIG. 7, variations of one or more of the same, portions of one or more of the same, combinations of one or more of the same, or any other suitable network. Network 204 may facilitate communication or data transfer using wireless or wired connections. In one embodiment, computing device 202 may access (or at least attempt to access) network 204 via wireless access point 206.

Figure 3:
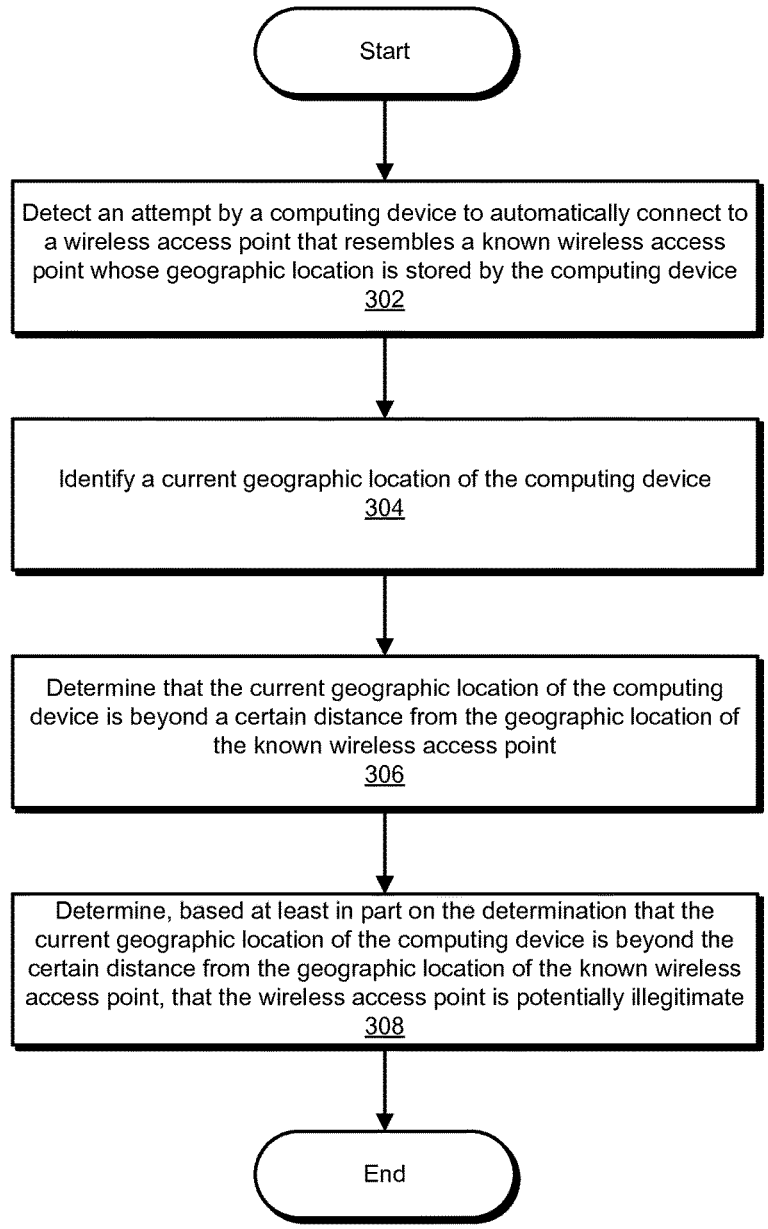
FIG. 3 is a flow diagram of an exemplary method for detecting potentially illegitimate wireless access points.

FIG. 3 is a flow diagram of an exemplary computer-implemented method 300 for detecting potentially illegitimate wireless access points. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may detect an attempt by a computing device to automatically connect to a wireless access point that resembles a known wireless access point whose geographic location is stored by the computing device. For example, detection module 104 may, as part of computing device 202 in FIG. 2, detect attempt 208 by computing device 202 to automatically connect to wireless access point 206 that resembles a known wireless access point whose geographic location is stored within known location information 210 by computing device 202.

The systems described herein may detect an attempt by a computing device to automatically connect to a wireless access point in a variety of ways. In some examples, detection module 104 may detect attempt 208 by detecting the transmission of a request from computing device 202 to connect to a known wireless access point. For example, when initially establishing a connection to a wireless access point, computing device 202 may store information that identifies the wireless access point and/or the network to which the wireless access point provides access. In particular, computing device 202 may store the Basic Service Set IDentifier (BSSID) or Media Access control (MAC) address of the wireless access point. Additionally or alternatively, computing device 202 may store the Service Set IDentifier (SSID) of the network to which the known wireless access point provides access. Computing device 202 may later use this or any additional information to attempt to re-connect to the (now known) wireless access point.

In some embodiments, computing device 202 may be configured to automatically and periodically (e.g., every half second, every minute, etc.) transmit a request to connect to the known wireless access point. Specifically, when not connected to a network, computing device 202 may repeatedly transmit probe request frames (via an 802.11 protocol) that contain the BSSIDs of any known wireless access points. Notably, automatically transmitting such probe request frames may enable computing device 202 to efficiently access familiar networks. However, automatically re-connecting to public and/or unsecure networks may increase the risk of attackers eavesdropping on or gaining access to sensitive information transmitted via the networks. In addition, and as will be explained in greater detail below, automatically distributing probe request frames for known networks may allow attackers to gain access to sensitive information by generating malicious networks that resemble or claim to be known networks (via, e.g., devices such as the so-called WIFI PINEAPPLE).

In some examples, in response to transmitting the request to connect to the known wireless access point, computing device 202 may receive a communication from wireless access point 206 in which wireless access point 206 alleges to be the known wireless access point. As described herein, a wireless access point may "allege" to be a particular wireless access point by claiming to be, resembling, or otherwise displaying the characteristics of the particular wireless access point. In some examples, a malicious wireless access point may illegitimately or falsely allege to be another wireless access point by providing information (e.g., a BSSID) that identifies the other wireless access point.

In some examples, detection module 104 may determine that wireless access point 206 alleges to be the known wireless access point by detecting that computing device 202 receives a probe response frame (via an 802.11 protocol) from wireless access point 206 that identifies wireless access point 206 as the known wireless access point. For example, detection module 104 may determine that the probe response frame contains the previously-stored BSSID of the known wireless access point. In addition, detection module 104 may determine that the probe response frame contains station parameters, supported data rates, and/or any additional configuration details of wireless access point 206. Because the probe response frame contains information identifying the known wireless access point, computing device 202 may continue attempt 208 to connect to wireless access point 206 (by, e.g., attempting to send an authentication frame to wireless access point 206). However, in some examples, the systems described herein may prevent computing device 202 from completing attempt 208 until further analyzing the legitimacy of wireless access point 206.

In some embodiments, prior to the detection of attempt 208, determination module 108 may identify known location information 210 that identifies the geographic location of the known wireless access point. The term "geographic location," as used herein, generally refers to any type or form of physical place, area, or region in which a computing device and/or network device may be temporarily or permanently located. Examples of geographic locations include, without limitation, street addresses, GPS coordinates, particular buildings, neighborhoods, and/or cities.

Determination module 108 may identify the geographic location of the known wireless access point in a variety of ways. In some examples, determination module 108 may determine the geographic location of the known wireless access point by identifying the geographic location of computing device 202 while computing device 202 is initially connected to the known wireless access point. In one example, determination module 108 may identify the geographic location of computing device 202 by querying a GPS device within computing device 202. Additionally or alternatively, determination module 108 may analyze cellular connection location information and/or utilize IP address geolocation based on the WAN internet protocol address of computing device 202.

In some embodiments, determination module 108 may be unable to directly identify the location of computing device 202. For example, computing device 202 may not be equipped with a GPS device or internet protocol geolocation system. In such embodiments, determination module 108 may identify the geographic location of the known wireless access point by identifying any or all additional networks within a range of the known wireless access point. For example, determination module 108 may identify each available network in range of computing device 202 while computing device 202 is able to connect to the known wireless access point.

After identifying the geographic location of computing device 202, determination module 108 may store an association between the location and the known wireless access point as part of known location information 210 within computing device 202. As a specific example, FIG. 4 illustrates known location information 210 within computing device 202. As shown in FIG. 4, known location information 210 may specify the location of the known wireless access point with GPS coordinates (in this example, "38.0297° N, 84.4947° W").

Returning to FIG. 3, at step 304 one or more of the systems described herein may identify a current geographic location of the computing device. For example, identification module 106 may, as part of computing device 202 in FIG. 2, identify current location information 212 that describes a current geographic location of computing device 202.

The systems described herein may identify a current geographic location of the computing device in a variety of ways. In some embodiments, identification module 106 may identify the current geographic location of computing device 202 in response to detecting attempt 208. For example, identification module 106 may identify the current location of computing device 202 in response to each probe response frame received by computing device 202. Additionally or alternatively, identification module 106 may periodically determine and/or store the current geographic location of computing device 202.

In some examples, identification module 106 may identify the current geographic location of computing device 202 in the same or similar way as determination module 108 identified the geographic location of the known wireless access point. For example, if determination module 108 identified the geographic location of the known wireless access point by analyzing the WAN internet protocol address of computing device 202 while computing device 202 was connected to the known wireless access point, identification module 106 may identify and analyze a WAN internet protocol address of computing device 202 while computing device 202 attempts to connect to wireless access point 206. Similarly, if determination module 108 determined the geographic location of the known wireless access point by identifying additional networks within the range of the known wireless access point, identification module 106 may identify any additional networks currently within the range of wireless access point 206. In this way, the systems described herein may accurately and analogously compare the locations of the known wireless access point and wireless access point 206.

After identifying the current geographic location of computing device 202, identification module 106 may store the location as current location information 212 within computing device 202. As a specific example, FIG. 4 illustrates current location information 212 within computing device 202. As shown in FIG. 4, current location information 212 may specify the current location of computing device 202 with GPS coordinates (in this example, "38.2500° N, 85.7667° W").

Returning to FIG. 3, at step 306 one or more of the systems described herein may determine that the current geographic location of the computing device is beyond a certain distance from the geographic location of the known wireless access point. For example, determination module 108 may, as part of computing device 202 in FIG. 2, determine that the current geographic location of computing device 202 is beyond a certain distance from the geographic location of the known wireless access point.

The systems described herein may determine that the current geographic location of the computing device is beyond a certain distance from the geographic location of the known wireless access point in a variety of ways. In some examples, determination module 108 may determine that computing device 202 is currently farther away from the known wireless access point than a distance specified by distance information 214.

Distance information 214 may describe or impose any type or form of spatial measurement or dimension that determination module 108 may use to compare the relative separation of the known wireless access point and computing device 202. In an exemplary embodiment, distance information 214 may specify a radius (e.g., half a mile, 1 km, etc.) that represents a maximum distance and/or limit. In this embodiment, determination module 108 may determine that the current geographic location of computing device 202 exceeds the radius from the geographic location of the known wireless access point. In other embodiments, distance information 214 may specify a region (e.g., a building, a neighborhood, a city, etc.) surrounding the geographic location of the known wireless access point. In such embodiments, determination module 108 may determine that the current geographic location of computing device 202 falls outside of the region specified by distance information 214.

Figure 5:
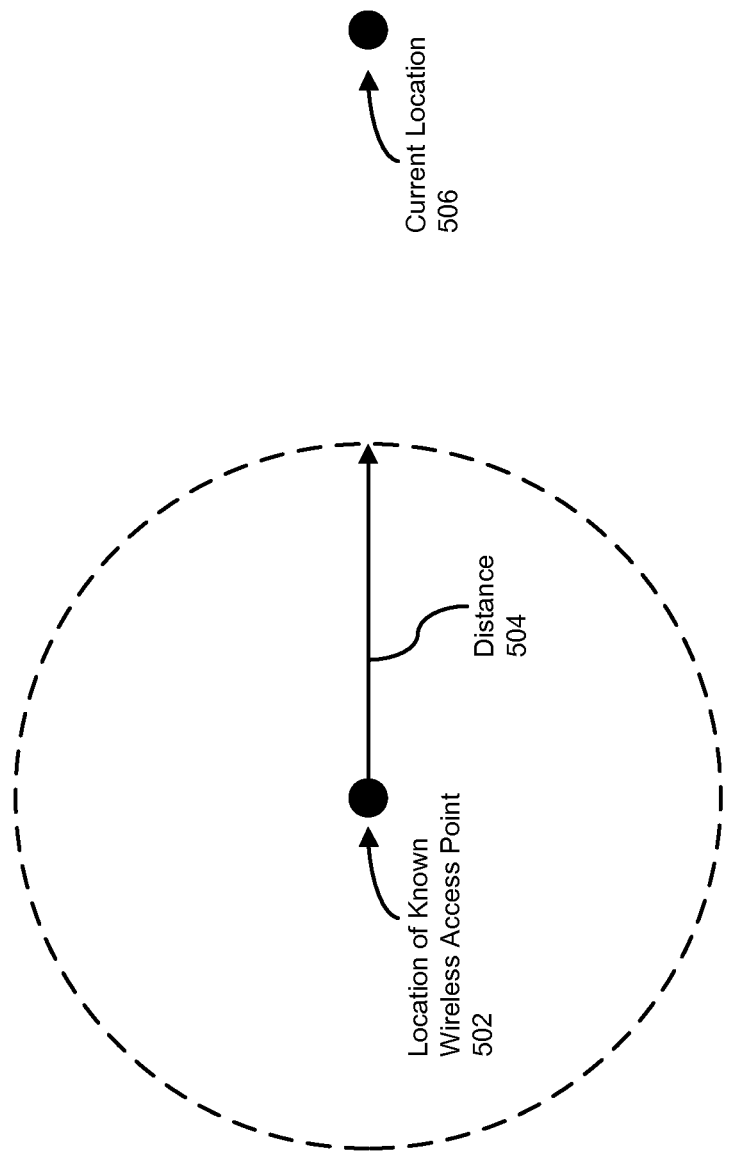
FIG. 5 is an illustration of an exemplary location of a computing device that is beyond a certain distance from the location of a known wireless access point.

As a specific example, FIG. 5 illustrates a current location 506 of computing device 202 that exceeds a distance 504 from a location of known wireless access point 502. In this example, distance 504 may represent a radius of 1 mile. Also in this example, location of known wireless access point 502 and current location 506 may be specified by the GPS coordinates illustrated within known location information 210 (i.e., "38.0297° N, 84.4947° W") and current location information 212 (i.e., "38.2500° N, 85.7667° W") within FIG. 4, respectively. Accordingly, determination module 108 may determine that location of known wireless access point 502 and current location 506 are separated by 70.94 miles, exceeding the 1 mile radius of distance 504.

In other examples, determination module 108 may determine that the current geographic location of computing device 202 is beyond the certain distance from the geographic location of the known wireless access point by comparing the networks near the known wireless access point and the networks near wireless access point 206. For example, as previously explained, determination module 108 may identify one or more networks in range of computing device 202 while computing device 202 is connected to the known wireless network. In addition, identification module 106 may identify one or more networks in range of computing device 202 while computing device 202 attempts to connect to wireless access point 206. Determination module 108 may then determine that some or all of the networks near the known wireless access point are not near wireless access point 206. As a result, determination module 108 may determine that the current geographic location of computing device 202 is beyond the certain distance from the geographic location of the known wireless access point.

Returning to FIG. 3, at step 308 one or more of the systems described herein may determine, based at least in part on the determination that the current geographic location of the computing device is beyond the certain distance from the geographic location of the known wireless access point, that the wireless access point is potentially illegitimate. For example, determination module 108 may, as part of computing device 202 in FIG. 2, determine that wireless access point 206 is potentially illegitimate based at least in part on the determination that the current geographic location of the computing device is beyond the certain distance from the geographic location of the known wireless access point.

The phrase "potentially illegitimate wireless access point," as used herein, generally refers to any type or form of wireless access point that may falsely allege to be another wireless access point. In some examples, an attacker may configure a potentially illegitimate wireless access point to identify itself as a particular wireless access point known to a computing device. However, a potentially illegitimate wireless access point may not necessarily represent an intentionally malicious wireless access point.

The systems described herein may determine that the wireless access point is potentially illegitimate in a variety of ways. In some examples, determination module 108 may determine that, because wireless access point 206 (resembling the known wireless access point) is available beyond a region associated with the known wireless access point, wireless access point 206 is potentially illegitimate.

In an exemplary embodiment, determination module 108 may determine that an attacker is spoofing the known wireless access point and/or a known network using a malicious network device (e.g., a WIFI PINEAPPLE). For example, an attacker may configure a WIFI PINEAPPLE to return a probe response frame for each received probe request frame that contains a request to access a different wireless access point. In some examples, computing device 202 may distribute multiple probe request frames for different known wireless access points. Determination module 108 may then determine that computing device 202 receives a probe response frame for each distributed probe request frame. As such, determination module 108 may determine that a nearby WIFI PINEAPPLE is spoofing multiple networks in response to intercepting probe request frames for the multiple networks.

In other embodiments, determination module 108 may determine that an attacker is spoofing a single wireless access point. For example, an attacker may configure a malicious device to spoof a public and/or popular wireless access point, such as a wireless access point for a network within an airport. In this example, determination module 108 may determine that an attacker is spoofing a particular wireless access point by determining that computing device 202 only receives a probe response frame in response to distributing a probe request frame for the particular wireless access point.

In response to determining that wireless access point 206 is potentially illegitimate, the systems described herein may provide one or more security services to computing device 202 and/or a user of computing device 202. For example, security module 110 may block computing device 202 from accessing wireless access point 206. In addition, security module 110 may prevent computing device 202 from accessing any nearby networks in the event that a device (such as a WIFI PINEAPPLE) is spoofing multiple networks. In other examples, security module 110 may prompt (via, e.g., a graphical user interface) a user of computing device 202 to manually decide whether to connect to wireless access point 206 despite the risk that wireless access point 206 is potentially malicious. For example, security module 110 may notify the user that wireless access point 206 is potentially illegitimate and thus warn the user that he or she should avoid transmitting sensitive information via wireless access point 206.

Furthermore, in some examples, the systems described herein may determine that a wireless access point is legitimate (e.g., that a known wireless access point is not being spoofed). For example, detection module 104 may detect an attempt by computing device 202 to automatically connect to an additional wireless access point that resembles the known wireless access point. In response to the attempt to automatically connect to the additional wireless access point, identification module 106 may identify an additional current geographic location of computing device 202. Determination module 108 may then determine that the additional current geographic location of computing device 202 is within the certain distance from the geographic location of the known wireless access point. As a result, determination module 108 may determine that the additional wireless access point is not illegitimate (e.g., that the additional wireless access point may actually be the known wireless access point). As such, security module 110 may enable computing device 202 to connect to the additional wireless access point.

As explained above, a computing device may detect an attempt to automatically connect to wireless access point that resembles a known wireless access point (e.g., a wireless access point to which the computing device has previously connected). In response to the attempt, the computing device may identify a current location of the computing device. The computing device may then compare the current location of the computing device to a previously determined location of the known wireless access point. In the event that the current location of the computing device is beyond a certain distance from the location of the known wireless access point, the computing device may determine that the wireless access point is potentially illegitimate. Specifically, the computing device may determine that a malicious network device is attempting to disguise the wireless access point as the known wireless access point.

Figure 6:
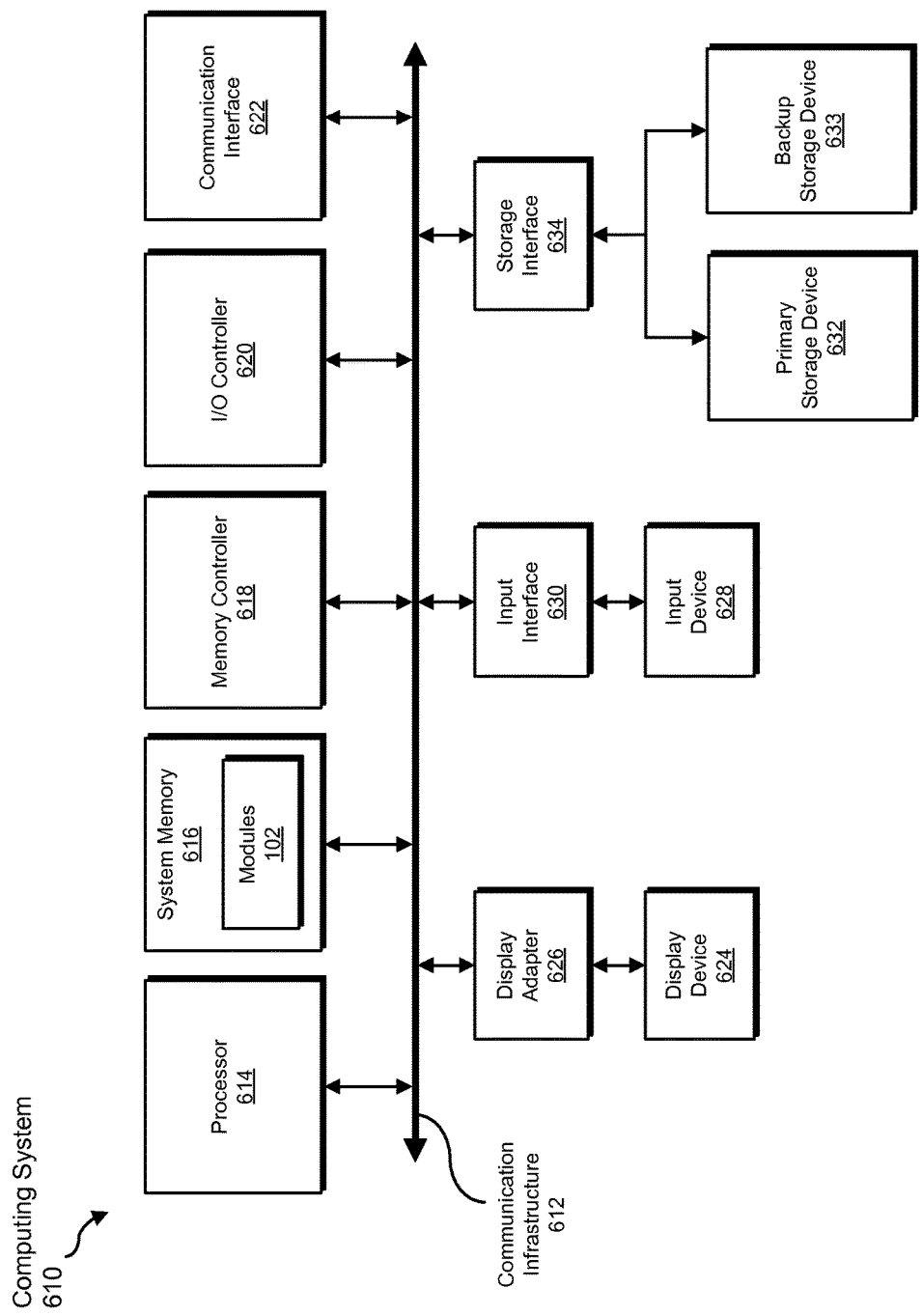
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like.

Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
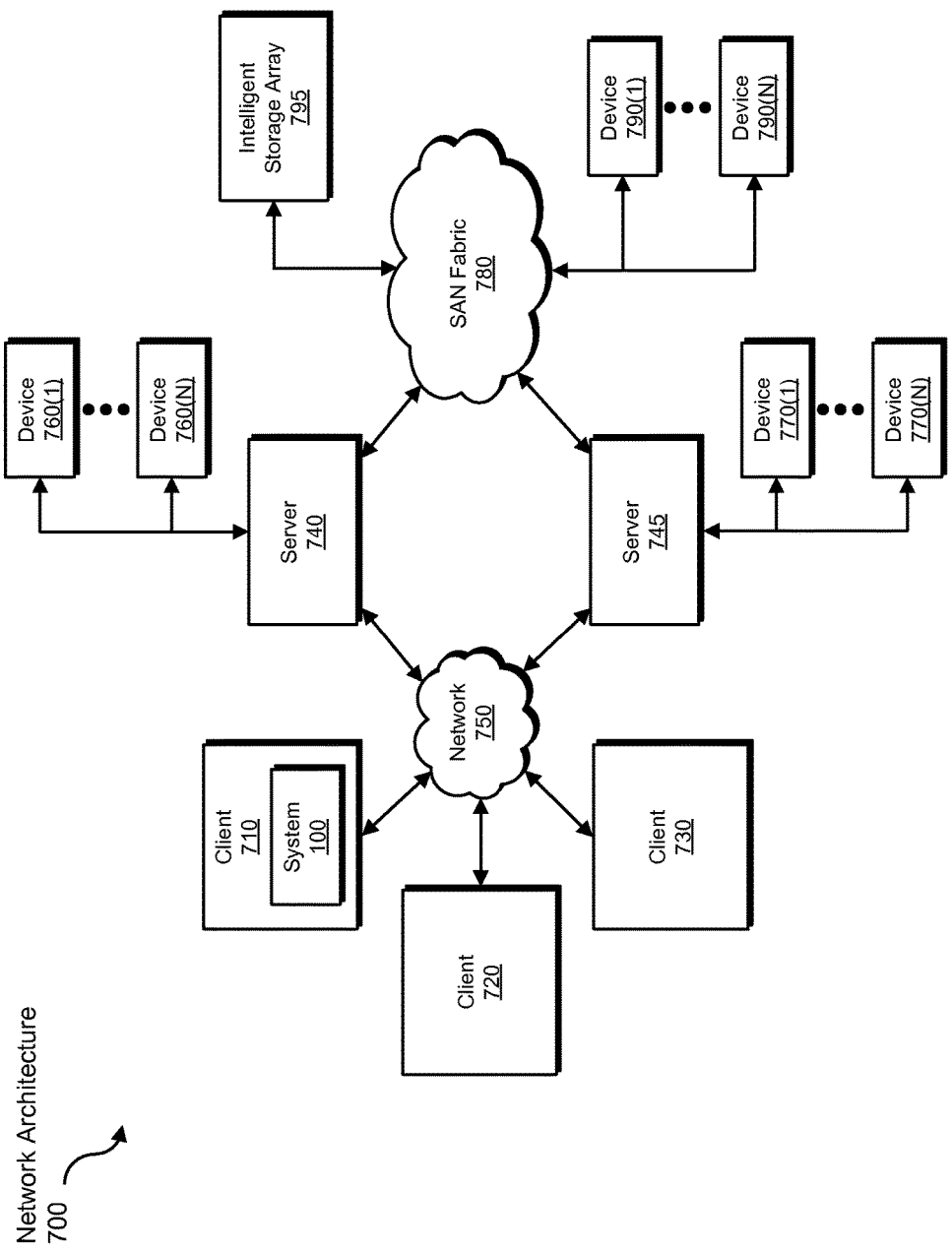
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting potentially illegitimate wireless access points.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an attempt by a computing device to connect to a wireless access point to be transformed, transform the attempt, output a result of the transformation to the computing device, use the result of the transformation to prevent the computing device from connecting to a potentially malicious wireless access point, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting potentially illegitimate wireless access points, at least a portion of the method being performed by a computing device comprising at least one processor, the method comprising:
   determining a geographic location of a known wireless access point that provides access to a legitimate wireless network by identifying at least one additional wireless network within a range of the known wireless access point while the computing device is connected to the known wireless access point;
   detecting an attempt by the computing device to automatically connect to a wireless access point that resembles the known wireless access point by determining that:

the computing device has transmitted a probe request frame to connect to the known wireless access point that contains an identifier of the known wireless access point; and the computing device has received, from the wireless access point, a probe response frame in response to the probe request frame that alleges the known wireless access point is available;

determining a current geographic location of the computing device by identifying at least a portion of the wireless networks within a range of the wireless access point;

determining that the current geographic location of the computing device is beyond a certain distance from the geographic location of the known wireless access point by determining that the additional wireless network within the range of the known wireless access point is not within the range of the wireless access point; and determining, based at least in part on the current geographic location of the computing device being beyond the certain distance from the geographic location of the known wireless access point, that the wireless access point is falsely alleging to be the known wireless access point, wherein the wireless access point falsely alleges to be the known wireless access point by:

extracting the identifier of the known wireless access point from within the probe request frame transmitted by the computing device; and including the identifier of the known wireless access point within the probe response frame sent to the computing device.

2. The method of claim 1, wherein determining the geographic location of the known wireless access point is performed prior to detecting the attempt to automatically connect to the wireless access point.

3. The method of claim 2, further comprising storing the geographic location of the known wireless access point within the computing device.

4. The method of claim 1, wherein:
determining the geographic location of the known wireless access point further comprises at least one of:
querying a Global Positioning System (GPS) device within the computing device; and
analyzing an internet protocol address of the computing device; and
determining the current geographic location of the computing device further comprises at least one of:
querying the GPS device within the computing device; and
analyzing a current internet protocol address of the computing device.

5. The method of claim 4, wherein determining that the current geographic location of the computing device is beyond the certain distance from the geographic location of the known wireless access point further comprises determining that the current geographic location of the computing device exceeds a certain radius from the geographic location of the known wireless access point.

6. The method of claim 1, wherein identifying the additional wireless network within the range of the known wireless access point is performed in response to determining that the computing device is not equipped with a functional geolocation system.

7. The method of claim 1, further comprising blocking access to the wireless access point in response to determining that the wireless access point is falsely alleging to be the known wireless access point.

8. The method of claim 1, further comprising prompting a user of the computing device to manually decide whether to connect to the wireless access point in response to determining that the wireless access point is falsely alleging to be the known wireless access point.

9. The method of claim 1, further comprising:
detecting an attempt by the computing device to automatically connect to an additional wireless access point that resembles the known wireless access point;
identifying an additional current geographic location of the computing device;
determining that the additional current geographic location of the computing device is within the certain distance from the geographic location of the known wireless access point; and
in response to determining that the additional current geographic location of the computing device is within the certain distance from the geographic location of the known wireless access point, enabling the computing device to connect to the additional wireless access point.

10. The method of claim 1, wherein detecting the attempt by the computing device to automatically connect to the wireless access point that resembles the known wireless access point comprises determining that the computing device is configured to transmit probe request frames to connect to the known wireless access point at predetermined intervals.

11. The method of claim 1, wherein the wireless access point transmits the probe response frame in response to intercepting the probe request frame transmitted by the computing device.

12. A system for detecting potentially illegitimate wireless access points, the system comprising:
a determination module, stored in memory, that determines a geographic location of a known wireless access point that provides access to a legitimate wireless network by identifying at least one additional wireless network within a range of the known wireless access point while a computing device is connected to the known wireless access point;
a detection module, stored in memory, that detects an attempt by the computing device to automatically connect to a wireless access point that resembles the known wireless access point by determining that:
the computing device has transmitted a probe request frame to connect to the known wireless access point that contains an identifier of the known wireless access point; and
the computing device has received, from the wireless access point, a probe response frame in response to the probe request frame that alleges the known wireless access point is available;
an identification module, stored in memory, that determines a current geographic location of the computing device by identifying at least a portion of the wireless networks within a range of the wireless access point;
wherein the determination module:
determines that the current geographic location of the computing device is beyond a certain distance from the geographic location of the known wireless access point by determining that the additional wireless network within the range of the known wireless access point is not within the range of the wireless access point; and
determines, based at least in part on the current geographic location of the computing device being beyond the certain distance from the geographic location of the known wireless access point, that the wireless access point is falsely alleging to be the known wireless access point, wherein the wireless access point falsely alleges to be the known wireless access point by:
  extracting the identifier of the known wireless access point from within the probe request frame transmitted by the computing device; and
  including the identifier of the known wireless access point within the probe response frame sent to the computing device; and
at least one processor that executes the detection module, the identification module, and the determination module.

13. The system of claim 12, wherein the determination module determines the geographic location of the known wireless access point prior to the detection module detecting the attempt to automatically connect to the wireless access point.

14. The system of claim 13, wherein the determination module further stores the geographic location of the known wireless access point within the computing device.

15. The system of claim 14, wherein:
the determination module further identifies the geographic location of the computing device by at least one of:
  querying a GPS device within the computing device; and
  analyzing an internet protocol address of the computing device; and
the identification module further identifies the current geographic location of the computing device by at least one of:
  querying the GPS device within the computing device; and
  analyzing a current internet protocol address of the computing device.

16. The system of claim 15, wherein the determination module further determines that the current geographic location of the computing device is beyond the certain distance from the geographic location of the known wireless access point by determining that the current geographic location of the computing device exceeds a certain radius from the geographic location of the known wireless access point.

17. The system of claim 12, wherein the determination module identifies the additional wireless network within the range of the known wireless access point in response to determining that the computing device is not equipped with a functional geolocation system.

18. The system of claim 12, wherein the detection module detects the attempt by the computing device to automatically connect to the wireless access point that resembles the known wireless access point by determining that the computing device is configured to transmit probe request frames to connect to the known wireless access point at predetermined intervals.

19. The system of claim 12, wherein the wireless access point transmits the probe response frame in response to intercepting the probe request frame transmitted by the computing device.

20. A non-transitory computer-readable medium comprising one or more computer-executable instructions that, when executed by at least one processor of a computing device, cause the computing device to:
  determine a geographic location of a known wireless access point that provides access to a legitimate wireless network by identifying at least one additional wireless network within a range of the known wireless access point while the computing device is connected to the known wireless access point;
  detect an attempt by the computing device to automatically connect to a wireless access point that resembles the known wireless access point by determining that:
    the computing device has transmitted a probe request frame to connect to the known wireless access point that contains an identifier of the known wireless access point; and
    the computing device has received, from the wireless access point, a probe response frame in response to the probe request frame that alleges the known wireless access point is available;
  determine a current geographic location of the computing device by identifying at least a portion of the wireless networks within a range of the wireless access point;
  determine that the current geographic location of the computing device is beyond a certain distance from the geographic location of the known wireless access point by determining that the additional wireless network within the range of the known wireless access point is not within the range of the wireless access point; and
  determine, based at least in part on the current geographic location of the computing device being beyond the certain distance from the geographic location of the known wireless access point, that the wireless access point is falsely alleging to be the known wireless access point, wherein the wireless access point falsely alleges to be the known wireless access point by:
    extracting the identifier of the known wireless access point from within the probe request frame transmitted by the computing device; and
    including the identifier of the known wireless access point within the probe response frame sent to the computing device.

* * * * *